(12) United States Patent
Arcas et al.

(10) Patent No.: US 8,204,299 B2
(45) Date of Patent: Jun. 19, 2012

(54) 3D CONTENT AGGREGATION BUILT INTO DEVICES

(75) Inventors: Blaise Aguera y Arcas, Seattle, WA (US); Brett D. Brewer, Sammamish, WA (US); Michael Fredrick Cohen, Seattle, WA (US); Steven Drucker, Bellevue, WA (US); Karim Farouki, Seattle, WA (US); Gary W. Flake, Bellevue, WA (US); Ariel J. Lazier, Seattle, WA (US); Stephen L. Lawler, Redmond, WA (US); Donald James Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 12/137,657

(22) Filed: Jun. 12, 2008

(65) Prior Publication Data

US 2009/0310851 A1 Dec. 17, 2009

(51) Int. Cl.
*G06K 9/00* (2006.01)
(52) U.S. Cl. ........................................... 382/154
(58) Field of Classification Search .................. 382/154, 382/284, 294
See application file for complete search history.

(56) References Cited

U.S. PATENT DOCUMENTS

| | | | |
|---|---|---|---|
| 5,301,117 A | 4/1994 | Riga | |
| 5,748,199 A | 5/1998 | Palm | |
| 6,333,749 B1 | 12/2001 | Reinhardt et al. | |
| 6,456,287 B1 | 9/2002 | Kamen et al. | |
| 6,549,651 B2 * | 4/2003 | Xiong et al. | 382/154 |
| 6,571,024 B1 * | 5/2003 | Sawhney et al. | 382/294 |
| 6,826,307 B1 | 11/2004 | Lau et al. | |
| 7,142,726 B2 | 11/2006 | Ziegler et al. | |
| 7,194,112 B2 * | 3/2007 | Chen et al. | 382/106 |
| 7,856,125 B2 * | 12/2010 | Medioni et al. | 382/118 |
| 7,912,257 B2 * | 3/2011 | Paley et al. | 382/128 |
| 2002/0158873 A1 | 10/2002 | Williamson | |
| 2003/0091227 A1 | 5/2003 | Chang et al. | |
| 2005/0285875 A1 * | 12/2005 | Kang et al. | 345/629 |
| 2007/0076920 A1 | 4/2007 | Ofek | |
| 2007/0103460 A1 | 5/2007 | Ahang et al. | |
| 2007/0237356 A1 | 10/2007 | Dwinell et al. | |

FOREIGN PATENT DOCUMENTS

KR 1020060131145 A 12/2006

(Continued)

OTHER PUBLICATIONS

International Search Report with Written Opinion dated Nov. 27, 2009.

(Continued)

*Primary Examiner* — John Strege
(74) *Attorney, Agent, or Firm* — Shook Hardy & Bacon LLP

(57) ABSTRACT

The claimed subject matter provides a system and/or a method that facilitates capturing a portion 2-dimensional (2D) data for implementation within a 3-dimensional (3D) virtual environment. A device that can capture one or more 2D images, wherein the 2D image is representative of a corporeal object from a perspective dictated by an orientation of the device. The device can comprise a content aggregator that can construct a 3D image from two or more 2D images collected by the device, in which the construction is based at least in part upon aligning each corresponding perspective associated with each 2D image.

18 Claims, 10 Drawing Sheets

FOREIGN PATENT DOCUMENTS

| | | |
|---|---|---|
| WO | WO 2007041696 A2 | 4/2007 |
| WO | WO 2007084647 A2 | 7/2007 |

OTHER PUBLICATIONS

C. Baillard, et al. Automatic Line Matching and 3d Reconstruction of Buildings from Multiple Views http://66.102.1.104/scholar?hl=en&lr=&q=cache:mBj77QRcgjwJ:www.robots.ox.ac.uk:5000/~vgg/publications/papers/baillard99a.pdf. Last accessed Apr. 28, 2008, 14 pages.

D. Flamanc, et al. 3d City Models: An Operational Approach using Aerial Images and Cadastral Maps, ISPRS Archives, vol. XXXIV, Part 3/W8, Munich, Sep. 17-19, 2003. http://www.commission3.isprs.org/pia/papers/pia03_s2p2.pdf. Last accessed Apr. 28, 2008, 6 pages.

Katerina Darilkova, et al. New Methods for 3D Scene Creation using 2D Images http://cmp.felk.cvut.cz/~jancom1/SPMIC05.pdf. Last accessed Apr. 28, 2008, 12 pages.

Azevedo, et al. Building External Anatomical Structures from Images using a Single off-the-Shelf Camera. III International Congress on Computational Bioengineering, Isla de Margarita, Venezuela, Sep. 17 to 19, 2007. http://www.fe.up.pt/si/file_get.publ_artigo?p_id=13947. Last accessed Apr. 28, 2008, 6 pages.

Fudono, et al., Interactive 3-D Modeling System Using a Hand-Held Video Camera, Jun. 28, 2005, Image Analysis (Lecture Notes in Computer Science; LNCS), Springer-Verlag, Berlin/Heidelberg, Germany, pp. 1248-1248, XP010010996, ISBN: 978-3-540-26320-3.

European Search Report for PCT/US2009041228, dated Sep. 22, 2011.

* cited by examiner

3D CONTENT AGGREGATION BUILT INTO DEVICES

CROSS REFERENCE TO RELATED APPLICATION(S)

This application relates to U.S. patent application Ser. No. 12/129,247 filed on May 29, 2008, entitled "THREE-DIMENSIONAL ENVIRONMENT CREATED FROM VIDEO," U.S. patent application Ser. No. 12/116,323 filed on May 7, 2008, entitled "PROCEDURAL AUTHORING," and U.S. patent application Ser. No. 12/112,567 filed on Apr. 30, 2008, entitled "INTERMEDIATE POINT BETWEEN IMAGES TO INSERT/OVERLAY ADS." The entireties of such applications are incorporated herein by reference.

BACKGROUND

Advances in digital imaging technology have enabled people to easily and efficiently capture large collections of digital photographs and store them on compact storage media, hard drives or other devices. Typically, browsing the large collections of digital photographs involves presenting a slide show of images in the collections. In addition, browsing can involve displaying a large screen of low-resolution thumbnail images of the digital photographs. The thumbnail images enable a user to perceive a plurality of photographs simultaneously at the cost of image quality and detail.

Typical image browsing mechanisms do not convey real world relationships among photographs. For example, given a collection of photographs of a landscape or landmark, a user is not presented with information regarding how locations from which the photographs were taken relate to one another. Moreover, such mechanisms do not allow browsing between photographs or transitions between photographs based upon a real world relationship. In general, browsing between photographs with conventional techniques involves a blind approach to understanding perspective and location between photographs.

In addition to digital still photographs, conventional digital cameras enable users to shoot video. Typically, videos and photographs are managed and viewed separately regardless of sharing content, imagery, or scenes. For example, although a device can collect real-time video and a still photograph of a scene, the replay of such collected data is done separately. Additionally, much like digital still photography, conventional techniques utilize a blind approach to conveying relationships and shared perspectives between two or more videos.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate capturing 2-dimensional imagery for implementation within a 3-dimensional virtual environment. A content aggregator can collect and combine a plurality of two dimensional (2D) images or content to create a three dimensional (3D) image, wherein such 3D image can be explored (e.g., displaying each image and perspective point) in a virtual environment. For example, a collection of pictures/photographs of a pyramid (e.g., a first photo of a first side of the pyramid, a second photo of a second side of the pyramid, a third photo of a third side of the pyramid, and a fourth photo of a fourth side of the pyramid) can be gathered to create a 3D image or object of the pyramid based on the substantial similar represented data and/or perspectives. A user can examine the 3D image in which each photo can be selected to display the photo and its perspective (e.g., location/orientation from which the photograph was captured). This innovation employs 2D content aggregation capabilities into various devices such as digital cameras, video, mobile devices, handhelds, portable digital assistants (PDA's), cellular devices, etc. In other words, a device can include a content aggregator setting or mode that can collect data for creation of a 3D image or object.

Moreover, the subject innovation can employ a guide or navigation to users to capture images or video unrepresented within a 3D image or object. Still further, the subject innovation can enable the re-creation of a 3D image or object by guidance and instruction on which photos or video to capture (e.g., re-creation or re-construction of a portion of a previously viewed 3D image). Such mode or setting can further include optimized photography or video configurations to enhance content aggregation capabilities. For instance, the content aggregation setting can provide instructions on how to capture a single photograph or video frame of a 3D image or a plurality of photographs for recreation of the 3D image.

In accordance with another aspect of the subject innovation, the device can utilize a guide (e.g., video, audio, etc.) to instruct and navigate a user along paths to collect pictures, photographs, or video. To identify an exact location to recreate a picture/photograph associated with a 3D image, for example, the device can leverage a global positioning system (GPS). In addition to allowing a user to capture images to his or her liking, the device can alert a user to take a photograph/picture/video of an object at a certain location in order to update a 3D image, a 3D object, a 3D virtual environment, and the like, wherein such photograph/picture/video from the location is needed (e.g., unrepresented) for 3D imagery creation. In other aspects of the claimed subject matter, methods are provided that facilitates capturing a portion of data (e.g., images, photography, video, etc.) with a device to construct a 3D image or object from such captured portion of data.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
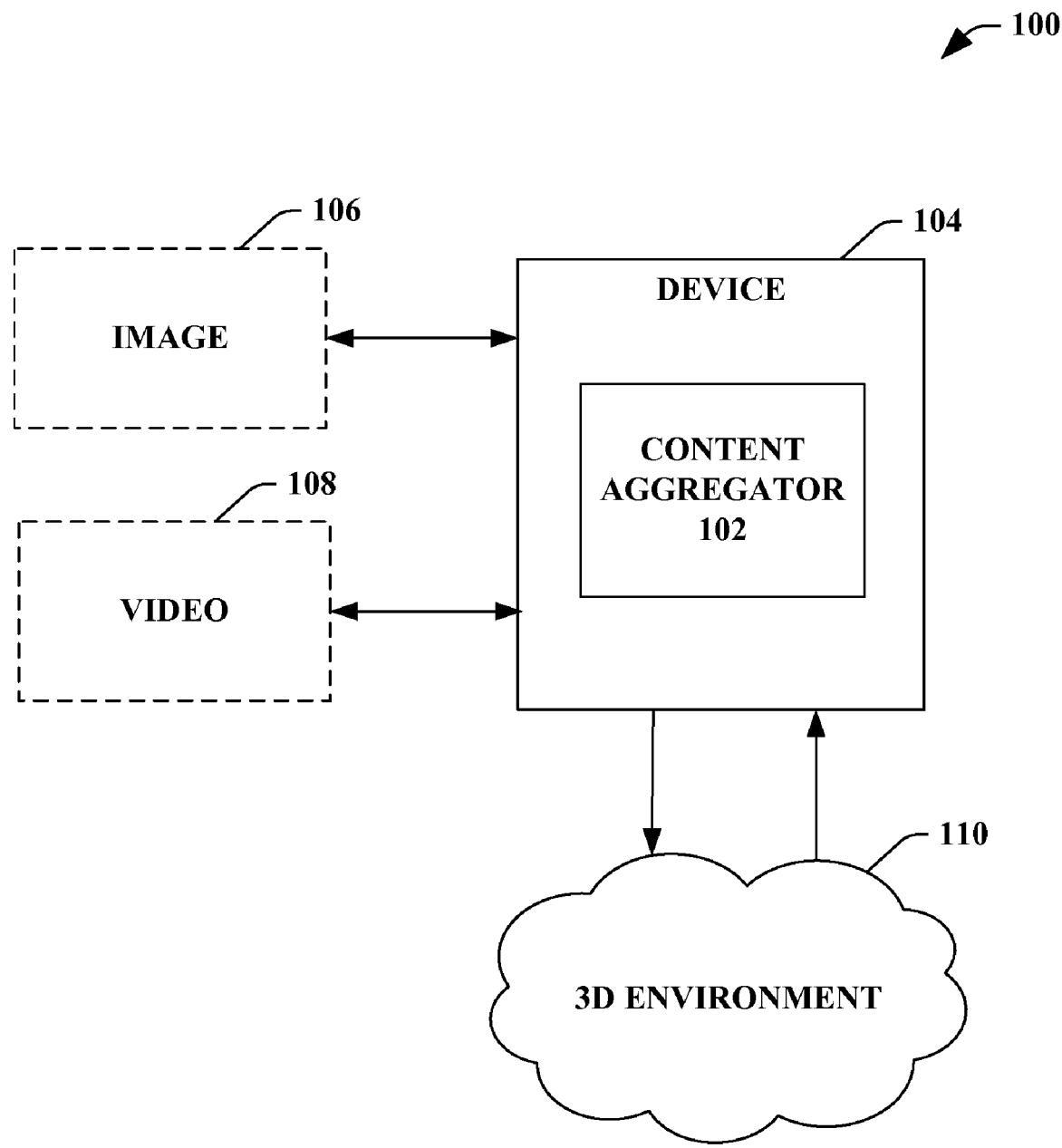
FIG. 1 illustrates a block diagram of an exemplary system that facilitates capturing 2-dimensional (2D) imagery with a device in order to construct a 3-dimensional (3D) object.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "evaluator," "aggregator," "environment," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates capturing 2-dimensional (2D) imagery with a device in order to construct a 3-dimensional (3D) object. The system 100 can include a device 104 that can capture and/or or collect content, wherein the content can be at least one of a portion of an image 106 or a portion of a video 108. Furthermore, the device 104 can include a content aggregator 102 that can construct a 3D image or object with the captured content (e.g., the portion of image 106, the portion of video 108, etc.). The content aggregator 102 can construct the 3D image or object by aligning 2D content (e.g., the portion of image 106, the portion of video 108, etc.) based at least in part upon corresponding perspectives or point-of-views of such 2D content. For example, the device 104 can capture or collect content from a particular perspective or point-of-view, wherein such perspective or point-of-view is dependent upon the orientation of the device 104.

Moreover, the system 100 can include a 3D environment 110 that can include the two or more 2D images each having a specific perspective or point-of-view. It is to be appreciated that the 3D environment 110 can be incorporated into the device 104 and/or a separate component/environment, and/or any suitable combination thereof. In particular, the 2D images can be aggregated or collected by the content aggregator 102 included within the device 104 in order to construct a 3D image or object, wherein the collection and/or aggregation can be based upon each 2D image perspective. Thus, the 2D images can be constructed in order to provide a 3D image within the 3D environment 110 or the device 104 that can be explored, navigated, browsed, etc. The 3D environment 110 can host any suitable number of 2D content and/or 3D images or objects. For instance, the constructed 3D object can be created within the device 104 and then uploaded to the 3D environment. It is to be appreciated that the 3D constructed object (e.g., image, etc.) can be from any suitable 2D content such as, but not limited to, images, photos, videos (e.g., a still frame of a video, etc.), audio, pictures, media data, photographs, metadata, trade cards, any media representing a portion of a physical real world, a picture of an object, a content representing an item, a content depicting an entity, a corporeal object within the real world, etc. For example, the construction of the 3D object or image can be hosted within the device 104. In another example, the device 104 can capture 2D content and communicate such data to the 3D environment 110, wherein the environment 110 can create the 3D object or image and communicate such 3D object or image to the device 104.

For example, a 3D environment can be explored in which the 3D image or object can be a cube (e.g., a corporeal object in a physical real world or environment). In general, the 3D image or object can be constructed by aligning 2D content with at least one of a shared perspective, an overlap in coverage within the 2D content (e.g., picture A and picture B both display a portion of the cube, etc.), a substantially similar point-of-view, and/or any other relation associated with the 2D content in order to accurately depict the cube (e.g., metadata, tag definition, etc.). Thus, the cube can be created by combining a first image of a first face of the cube (e.g., the perspective is facing the first face of the cube), a second image of a second face of the cube (e.g., the perspective is facing the second face of the cube), a third image of a third face of the cube (e.g., the perspective is facing the third face of the cube), a fourth image of a fourth face of the cube (e.g., the perspective is facing the fourth face of the cube), a fifth image of a fifth face of the cube (e.g., the perspective is facing the fifth face of the cube), and a sixth image of a sixth face of the cube (e.g., the perspective is facing the sixth face of the cube). As discussed, the images of the cube can share a portion of perspective of imagery (e.g., overlap between the images). By aggregating the images of the cube based on their perspectives or point-of-views, a 3D image of the cube can be created within the 3D environment 110 which can be displayed, viewed, navigated, browsed, and the like.

Following the above example, the content aggregator 102 can leverage captured and/or collected content from the device 104 and enable seamless and automatic generation of 3D images or objects for exploration, navigation, display, etc. The device 104 can automatically create the 3D image or object from the 2D content collected rather than receiving such content from an outside source (e.g., the Internet, a network, a server, an external hard drive, etc.). In another example, the device 104 can automatically create the 3D image or object from the 2D content collected and supplement such 3D image or object with content from an outside source. In general, the subject innovation enables automatic collection of content (e.g., images, video, etc.) and generation of a 3D image or object constructed from such 2D content within the device 104.

In addition, the system 100 can include any suitable and/or necessary interface component (not shown), which provides various adapters, connectors, channels, communication paths, etc. to integrate the content aggregator 102 and/or the device 104 into virtually any operating and/or database system(s) and/or with one another. In addition, the interface component can provide various adapters, connectors, channels, communication paths, etc., that provide for interaction with the content aggregator 102, the device 104, the portion of image 106, the portion of video 108, the 3D environment (not shown), and any other device and/or component associated with the system 100.

Figure 2:
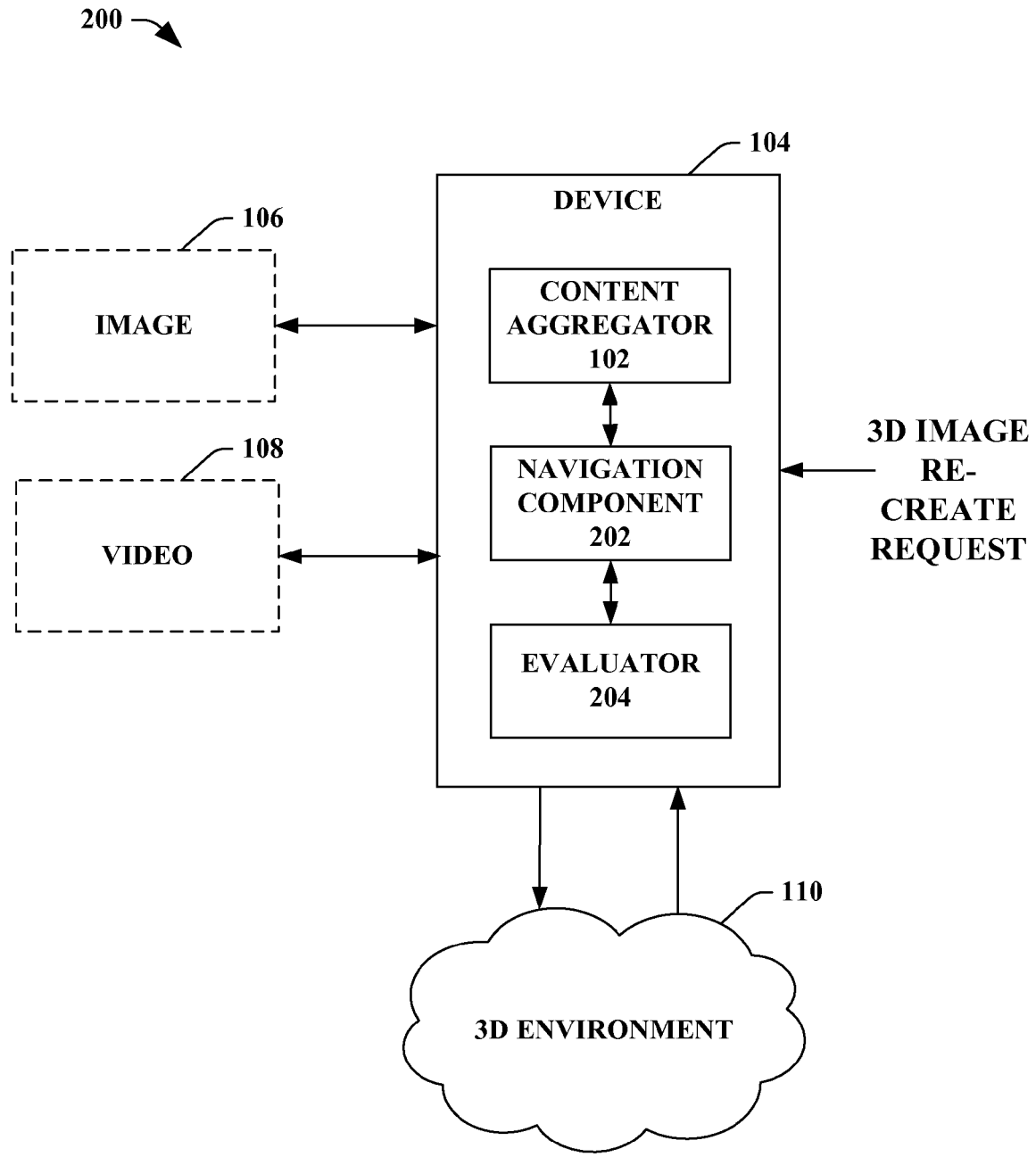
FIG. 2 illustrates a block diagram of an exemplary system that facilitates re-creating a 3D object utilizing a device.

FIG. 2 illustrates a system 200 that facilitates re-creating a 3D object utilizing a device. The system 200 can include the device 104 with an incorporated content aggregator 102. The combination of the device 104 and the content aggregator 102 can provide seamless capture of 2D images which can be utilized to construct a 3D image or object, wherein the 3D image or object can be viewed, displayed, navigated, explored, etc. In particular, the content aggregator 102 can enable a re-creation of a 3D image or object based upon a pre-defined structure or organization (e.g., a blueprint defining 2D content and placement of such content in order to construct a corresponding 3D image or object, etc.) of 2D content representative of an object, scene, landscape, etc. within the physical real world. Generally, the pre-defined structure or organization can enable a 3D image or object to be replicated by the system 200.

A request related to re-creating a 3D image can be received by the device 104, in which an evaluator 204 can analyze the request in order to identify a 3D image or object to re-create. It is to be appreciated that the request can be related to an existing 3D image or object (e.g., hosted by the 3D environment 110, hosted by an outside source, stored within the device 104, etc.) or a 3D image or object that has not been created or constructed from 2D content. In either case, the evaluator 204 can identify whether a new 3D image or object is being created or an existing 3D image or object is being re-created. Based on such request, a navigation component 204 can provide guidance or assistance in order to create a 3D image or object. For example, the assistance or guidance can be related to locations and/or orientations for the device 104 in order to capture 2D content. Upon capturing the content with identified perspectives, orientations, and the like, the content aggregator 102 within the device 102 can construct the 3D image or object. It is to be appreciated that the assistance or guidance can be a portion of audio, a portion of video, a route, a route on a geographic map, a set of geographic directions, a portion of text, a portion of a graphic, and/or any other suitable data that can facilitate identifying a location, a perspective, and an orientation for the device 104 to capture content for 3D construction. Such guidance or assistance can be communicated via the device, wherein the device can include at least one of a speaker or a display.

For example, a user may be traveling to a building that he or she would like to create or construct a 3D image or object from 2D content. Based on such desire, the user can utilize a device with an incorporated content aggregator to perform such task. The user can communicate a request, wherein the device can determine or ascertain a pre-defined structure or organization which lays out the necessary 2D content and corresponding perspectives and/or point-of-views. With this information (e.g., device orientation, angle, zoom, point-of-view, etc.), the 3D image or object can be constructed. In order to communicate this information to the user, the device can provide any suitable data such as audio, graphics, video, text, etc. For instance, the device can utilize a display to illustrate a map with routes and instructions on where to capture 2D content and from which perspective, orientation, angle, etc. Such display can further indicate the amount of content needed for a particular desired detail level (e.g., more content translates to higher degree of perspectives represented, etc.). Once constructed, the 3D image or object can be constructed and utilized within the device 104. In another example, the 3D image or object can be utilized with the 3D environment 110.

Moreover, it is to be appreciated that the device 104 can automatically ascertain which or how much 2D content needs to be captured in order to construct a 3D image or object. In other words, the device 104 need not utilize a pre-defined structure or organization. For instance, the device 104 can implement the evaluator 204 to continuously analyze the captured 2D content (e.g., portion of image 106, portion of audio 108, etc.) to determine if enough content has been collected. It is to be further appreciated that the amount of content for each 3D image or object can vary based on the complexity, perspectives, size, and/or any other suitable characteristics thereof.

Figure 3:
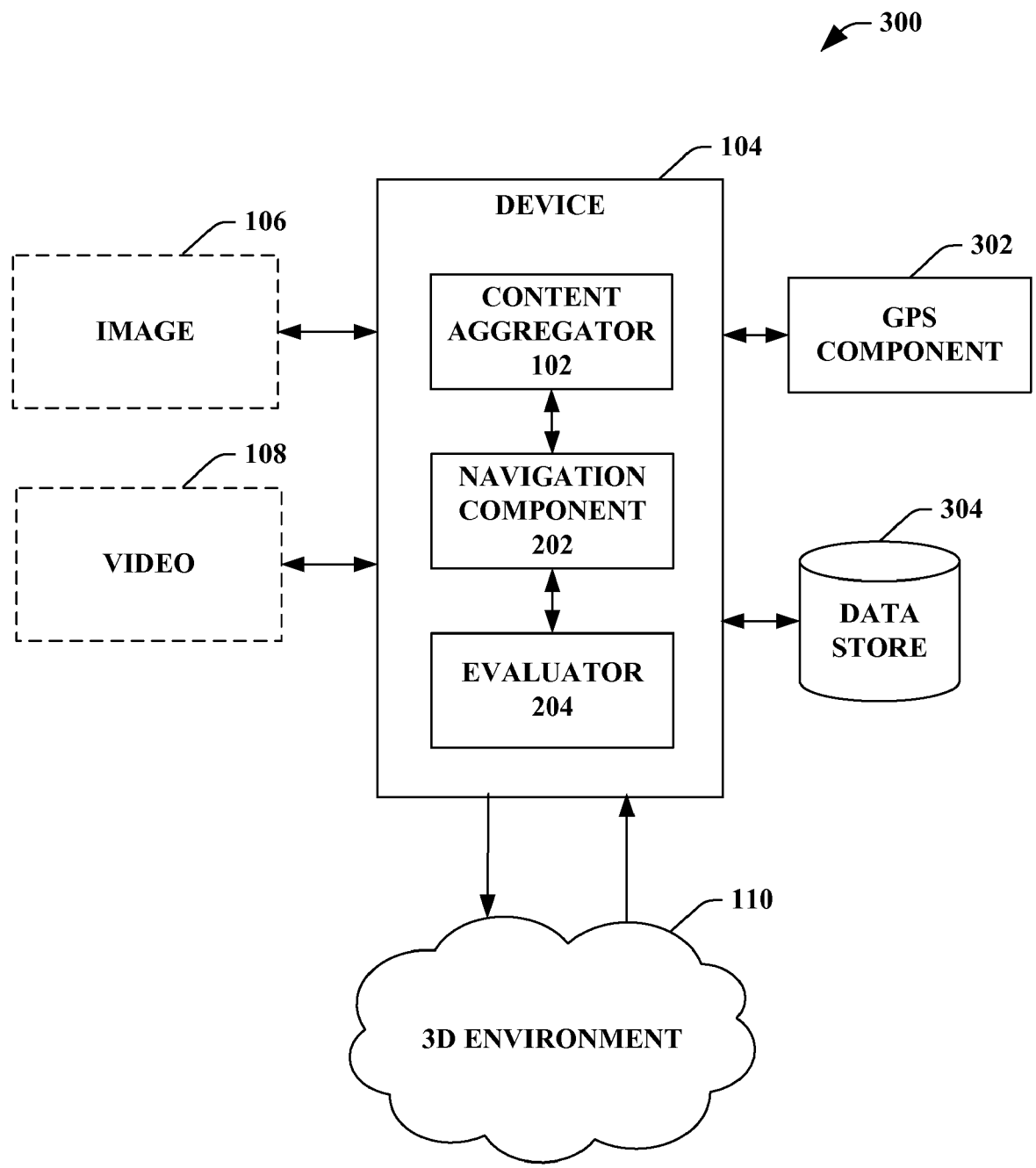
FIG. 3 illustrates a block diagram of an exemplary system that facilitates enhancing collection of 2D images with a device by leveraging a Global Positioning Service (GPS).

FIG. 3 illustrates a system 300 that facilitates enhancing collection of 2D images with a device by leveraging a Global Positioning Service (GPS). The system 300 can include the device 104 that integrates 2D content collection with a content aggregator 102 in order to create a 3D image or object. The device 104 can be any suitable device or component that can capture or collect 2D content (e.g., portion of image 106, portion of video 108, etc.) such as, but not limited to, a digital camera, a video camera, a camera, a smartphone, a handheld, a web camera, a mobile device, a portable digital assistant (PDA), a cellular device, a disposable camera, an integrated camera within a device (e.g., laptop camera, desktop camera, automobile camera, etc.), a computing device with image capturing capabilities, etc. In general, the system 300 can create a 3D image or object from 2D content, re-create an existing 3D image or object for the device 104 from 2D content, and/or supplement an existing 3D image or object with 2D content captured from the device 104.

The portion of video 108 can be a video segment which can include numerous video frames that can number in the hundreds or thousands depending on length of the segment. For instance, film can have 24 frames each second, television video can have approximately 30 frames per second and some equipment can capture hundreds of frames per second. Each individual frame is a single still image and rapid succession of frames enables subtle motion to be perceived. However, the plurality of frames in a single second are typically very similar in terms of the images captured. Accordingly, the content aggregator 102 can utilize the portion of video to generate a 3D image or object.

In one example of the system 300 supplementing an existing 3D image or object, the evaluator 204 can examine the 2D content associated with a specific 3D image or object. Based on such examination, the device 104 can be alerted or communicated to capture supplemental 2D content that can be utilized for the 3D image or object. For instance, the 3D environment 110 can host a plurality of 2D content and/or 3D images or objects, wherein particular 3D images or objects can be supplemented based on incomplete coverage, backup requirements, etc. The evaluator 204 can determine if such need exists, wherein the navigation component 202 can provide guidance or assistance in order to capture such needed 2D content. In general, the system 300 can allow incomplete or partial 3D images or objects to be completed with acquired 2D content. For example, the device 104 can provide a route on a map to a user in order to capture a 2D image of an object from a particular perspective since such image and perspective is not represented in the existing 3D image or object.

The system 300 can allow the device 104 to provide a local coverage of the 3D object or image (e.g., 2D content capturing, 2D image collection, etc.) or a global coverage within a community system. The local coverage can enable the device 104 to capture 2D content and create a local, private 3D object or image for the use of the device 104. The global coverage can allow the device 104 to capture 2D content and create a 3D object or image that is shared with the community. It is to be appreciated that the global coverage can be granular in that a portion of 2D content can be shared, a collection of 2D content, a portion of a 3D object, or the 3D object, etc. Additionally, the device 104 can enable a portion of 2D content that can be incorporated into the community system for representation of the 3D object or image.

Still further, the device 104 can leverage a global positioning system (GPS) component 302 to facilitate identifying locations, orientations, and perspectives in order to capture 2D content (e.g., portion of image 106, portion of video 108, etc.). It is to be appreciated that the GPS component 302 can be a stand-alone component (as depicted), incorporated into the device 104, and/or any suitable combination thereof. For instance, the device 104 can be a smartphone with photo/video capturing capabilities and a service that provides GPS services for location tracking. The GPS component 302 can be utilized in connection with the navigation component 202 in order to provide geographic positions, orientations, etc. in order to capture 2D content to construct a 3D image or object. It is to be further appreciated that the GPS component 302 and/or the device 104 can utilize an accelerometer (not shown) to identify specific angles or orientations in connection with the geographic location or position.

In addition, the device 104 can utilize a 2D content capture mode to which a view from the device 104 is compared to an existing 3D object or image in order to identify or locate a geographic position. In other words, the content being viewed and potentially captured as well as the orientation of the device 110 can be compared to existing 2D content representative of the 3D object, wherein the comparison can reveal the location and position of the device. Thus, by utilizing the existing 3D object or image and included 2D content, the geographic position and orientation of the device 104 can be determined without the GPS component 302.

The system 300 can further include a data store 304 that can include any suitable data related to the device 104, the content aggregator 102, the portion of image 106, the portion of video 108, the navigation component 202, the evaluator 204, the GPS component 302, etc. For example, the data store 304 can include, but not limited to including, 2D content, pre-defined structure or organization to align 2D content for a 3D image or object, constructed 3D images or objects, content collection settings (e.g., preferences, settings, passwords, etc.), routes, maps, geographic locations, orientations for 2D content, perspectives related to 2D content, alignments for 2D content, guidance for 2D content gathering, collected imagery, collected video, 3D environment data (e.g., 3D images, 3D objects, username, password, existing 2D content, required 2D content, etc.), GPS data, accelerometer data, data requests, etc.

It is to be appreciated that the data store 304 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 304 of the subject systems and methods is intended to comprise, without being limited to, these and any other suitable types of memory. In addition, it is to be appreciated that the data store 304 can be a server, a database, a hard drive, a pen drive, an external hard drive, a portable hard drive, and the like.

Figure 4:
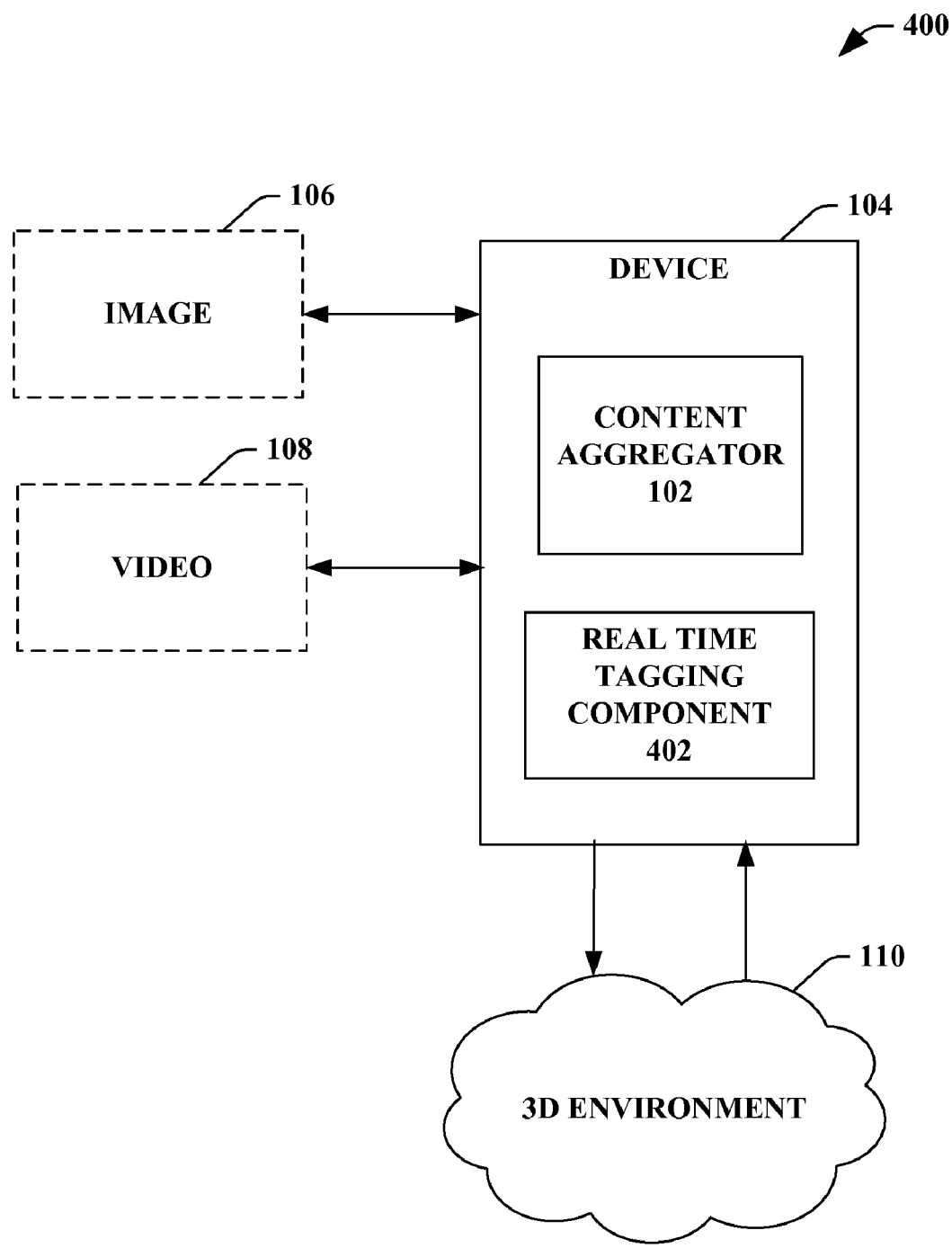
FIG. 4 illustrates a block diagram of an exemplary system that facilitates associating metadata to data collected from a device.

FIG. 4 illustrates a system 400 that facilitates associating metadata to data collected from a device. The system 400 can include the device 104 that can provide automatic capture of 2D content (e.g., portion of image 106, portion of video 108, etc.) and seamless creation of a 3D image or object constructed from the 2D content with the content aggregator 102, wherein construction is based upon aligning and organizing the 2D content based on perspectives and point-of-views related therewith. The device 104 can include a mode or setting that enables automatic collection or gathering of 2D images that can be utilized to construct a 3D image or object with the incorporated content aggregator 102. In particular, such mode or setting can leverage existing device settings and/or configurations in order to optimize the capture of 2D content for 3D object or image construction. For example, the device 104 can include scene modes (e.g., automatic, user defined, close-up, portrait, landscape, sports, night, winter, summer, night portrait, sunset, etc.), optional panoramic modes (e.g., optional since the content aggregator is robust to this setting, the 2D content can be made more similar, etc.), photo stitching modes (e.g., optional since the content aggregator is robust to this setting, the 2D content can be made more similar, etc.), flash mode (e.g., automatic flash, flash on, red eye reduction, no flash, etc.), timer settings, sequence mode (e.g., burst shot, delayed capture, etc.), exposure compensation, white balance, color tone, light sensitivity, contrast, sharpness, etc. Such device settings and/or modes can be optimized automatically, user-defined, and/or any suitable combination thereof.

The system 400 can further include a real time tagging component 402 that enables tagging of captured 2D content from the device 104. The real time tagging component 402 can append a portion of 2D content and/or a 3D image or object with any suitable metadata associated therewith. In particular, the real time tagging component 402 can incorporate metadata such as, but not limited to, at least one of a portion of geographic data, a portion of author data, a portion of owner data, a portion of security data, a time, a date, an angle, a perspective, a portion of device data, a zoom level, a zoom, a point-of-view, a portion of 3D object association data, a position within a 3D object, an alignment within a 3D object, a category definition, a topic definition, a ranking, a popularity ranking, a quality ranking, a frame rate, a resolution, an object representation, a portion of pure view data, a portion of authentic view data, etc. It is to be appreciated that such metadata can be utilized by the 3D environment 110, the content aggregator 102, the device 104, a disparate device, a disparate content aggregator, a community, a website, a network, a server, a user, a portion of software, an application, a portion of hardware, etc.

Figure 5:
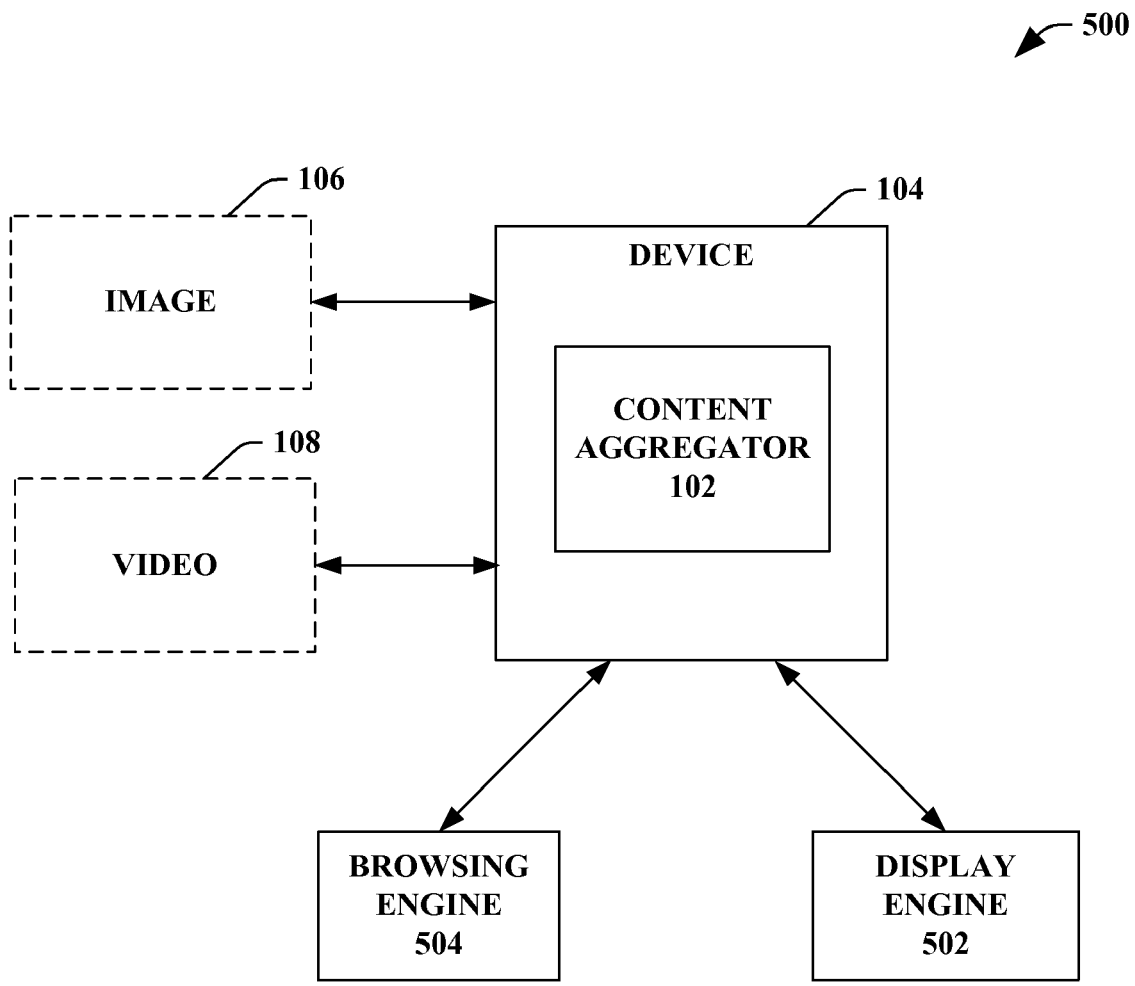
FIG. 5 illustrates a block diagram of exemplary system that facilitates utilizing a display technique and/or a browse technique in accordance with the subject innovation.

FIG. 5 illustrates a system 500 that facilitates utilizing a display technique and/or a browse technique in accordance with the subject innovation. The system 500 can include the device 104 that can capture at least one of the portion of image 106 or a portion of video 108 as described above. The system 500 can further include a display engine 502 that enables seamless pan and/or zoom interaction with any suitable data (e.g., 3D object data, 3D image, 2D content, 2D image, etc.), wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, device display, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, the 3D environment (not shown), the 3D image, the 3D object, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a 3D object or image, wherein various scales or views can be exposed by smooth zooming and/or panning.

As discussed, the system 500 can include the content aggregator 102 that can collect a plurality of two dimensional (2D) content (e.g., media data, images, video, photographs, metadata, trade cards, etc.) to create a 3D image or object that can be explored (e.g., displaying each image and perspective point) within the device 104 and/or a 3D environment (not shown). In order to provide a complete 3D image or object to a user, authentic views (e.g., pure views from images) are combined with synthetic views (e.g., interpolations between content such as a blend projected onto the 3D model). For instance, the content aggregator 102 can aggregate a large collection of photos of a place or an object, analyze such photos for similarities, and display such photos in a reconstructed 3D space to create a 3D object, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 102 can identify substantially similar content and zoom in to enlarge and focus on a small detail. The content aggregator 102 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

Figure 6:
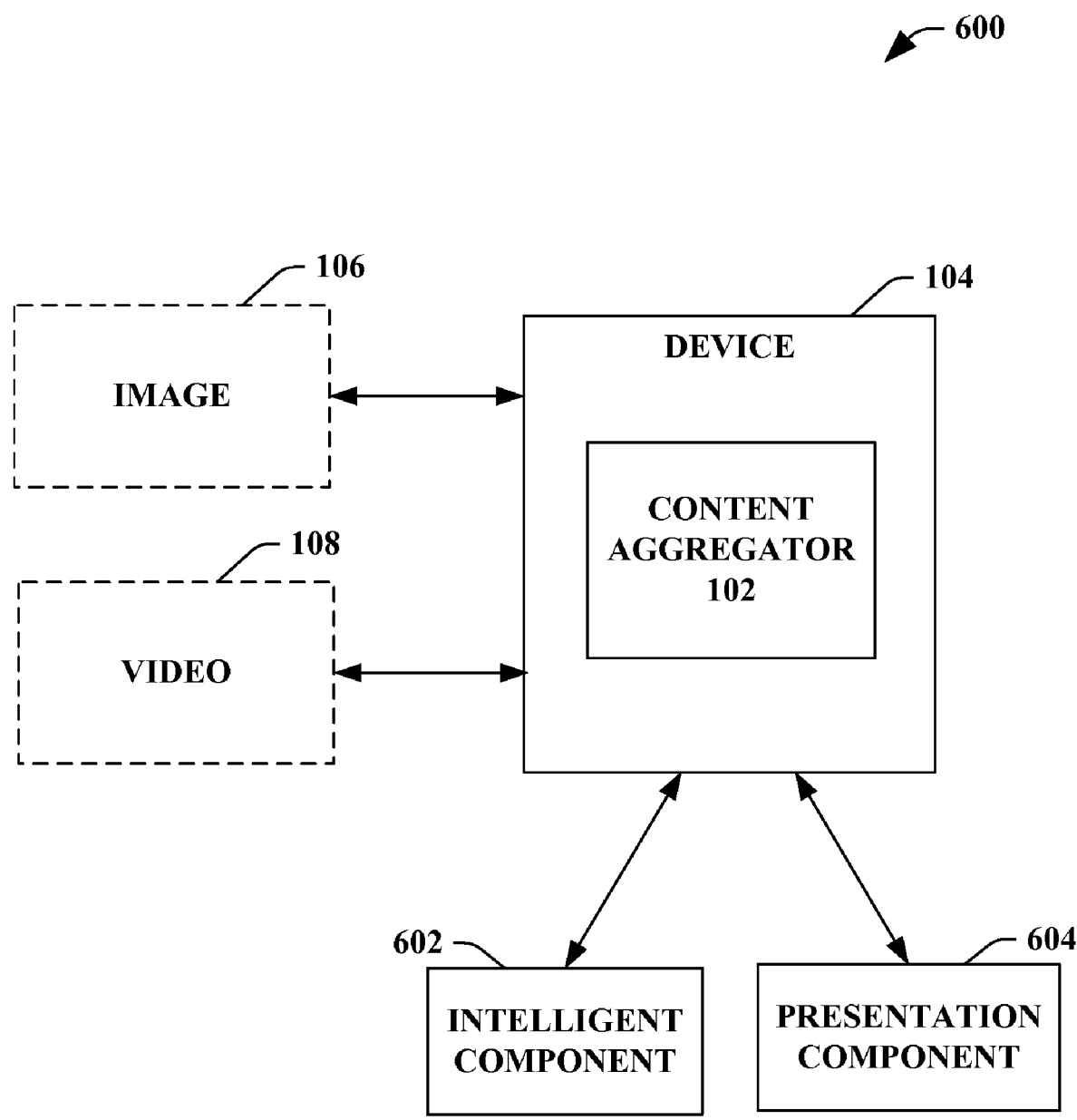
FIG. 6 illustrates a block diagram of an exemplary system that facilitates incorporating 2D content aggregation techniques into a device.

FIG. 6 illustrates a system 600 that employs intelligence to facilitate incorporating 2D content aggregation techniques into a device. The system 600 can include the device 104, the content aggregator 104, the portion of image 106, and the portion of video 108, which can be substantially similar to respective devices, aggregators, images, and video described in previous figures. The system 600 further includes an intelligent component 602. The intelligent component 602 can be utilized by the content aggregator 102 and/or the device 104 to facilitate capturing 2D content within a device 104 in order to create a 3D image or object. For example, the intelligent component 602 can infer 2D content for a 3D image or object, perspectives unrepresented within a 3D image or object, supplemental 2D content needed for a 3D image or object, device optimized settings for content aggregation, guidance or assistance for directing to capture 2D content, routes, maps, orientations, perspectives, point-of-views, angles, geographic location, tags for 2D content, metadata for captured 2D content, user preferences, settings, etc.

The intelligent component 602 can employ value of information (VOI) computation in order to identify optimal guidance or assistance to capture 2D content with a device on a per-user basis. For instance, by utilizing VOI computation, the most ideal and/or appropriate guidance or assistance to capture 2D content can be determined (e.g., user A prefers audio directions, user B likes routes on maps, route X is more ideal than route Y, etc.). Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The device 104 can further utilize a presentation component 604 that provides various types of user interfaces to facilitate interaction between a user and any component coupled to the device 104. As depicted, the presentation component 604 is a separate entity that can be utilized with the device 104. However, it is to be appreciated that the presentation component 604 and/or similar view components can be incorporated into the device 104 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the device 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
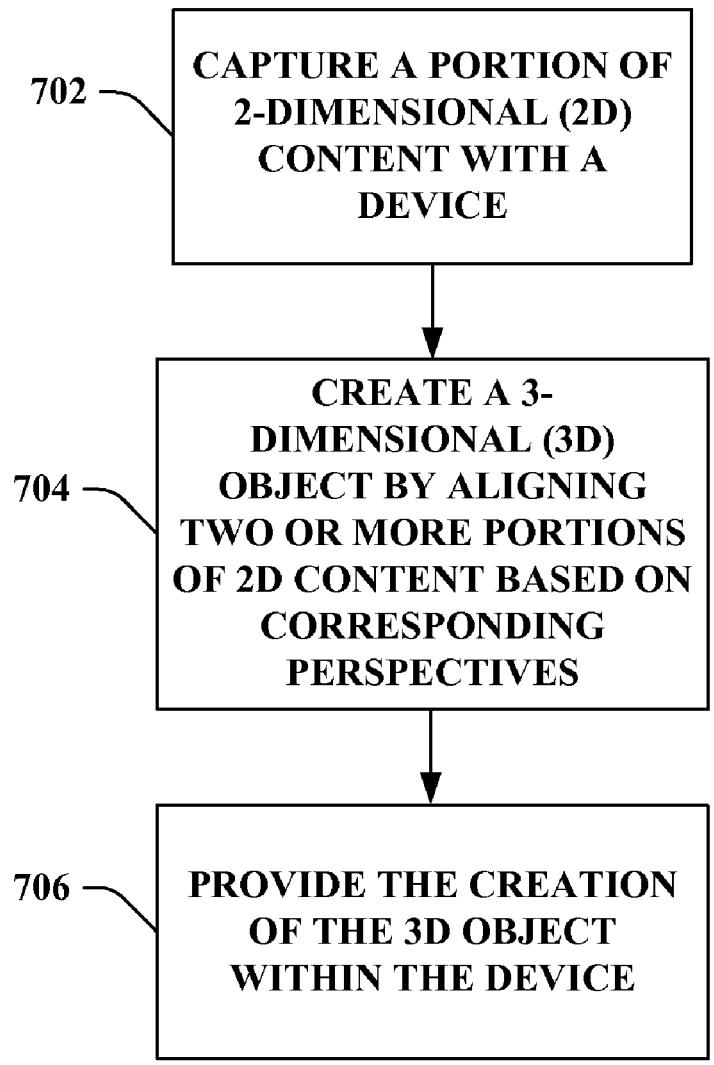
FIG. 7 illustrates an exemplary methodology for capturing 2-dimensional (2D) imagery with a device in order to construct a 3-dimensional (3D) object.
Figure 8:
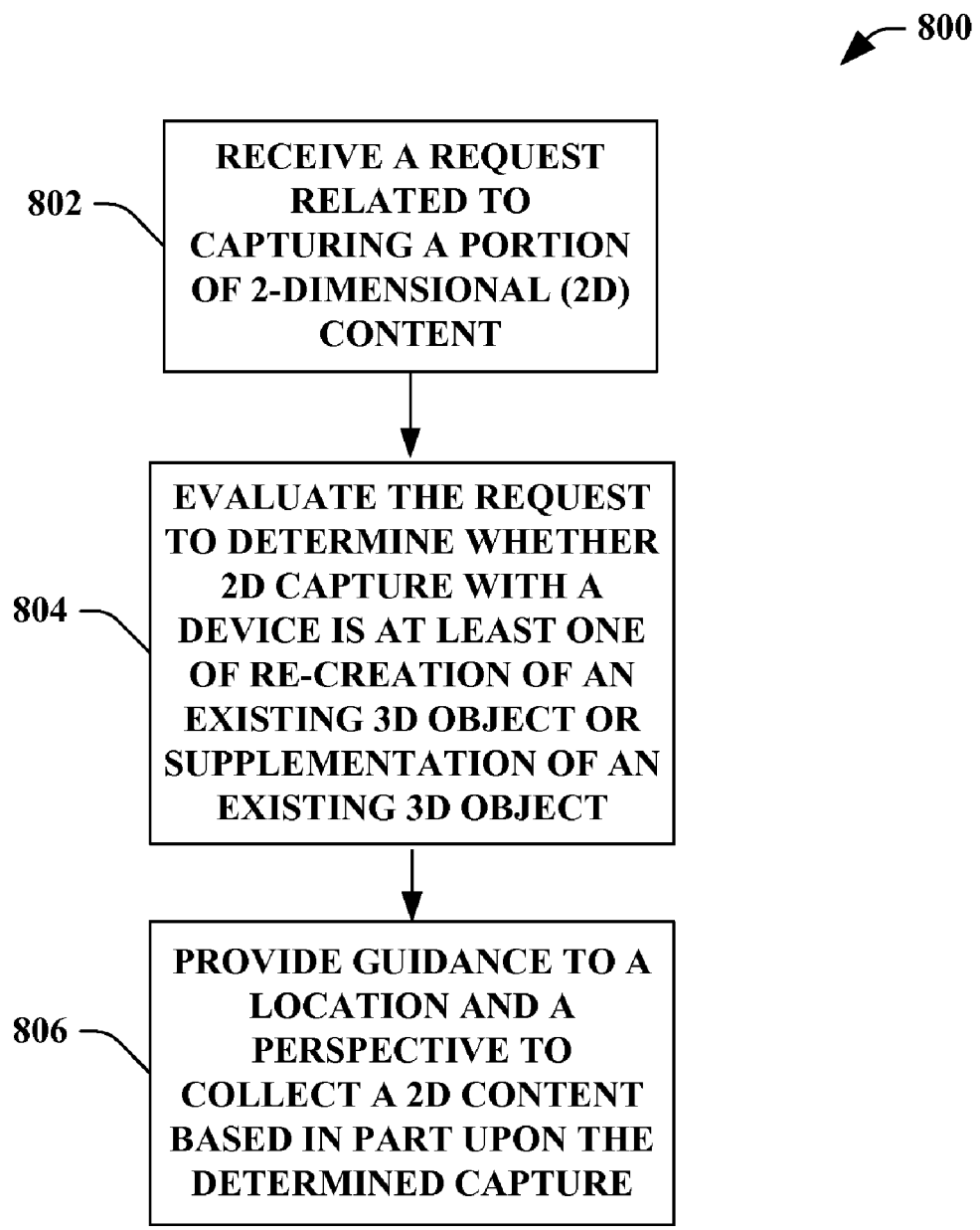
FIG. 8 illustrates an exemplary methodology that facilitates re-creating a 3D object or enhancing collection of 2D content related to a 3D object.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates capturing 2-dimensional (2D) imagery with a device in order to construct a 3-dimensional (3D) object. At reference numeral 702, a portion of 2-dimensional (2D) content can be captured with a device. The device can be any suitable device or component that can capture or collect 2D content such as, but not limited to, a digital camera, a video camera, a camera, a smartphone, a handheld, a web camera, a mobile device, a portable digital assistant (PDA), a cellular device, a disposable camera, an integrated camera within a device (e.g., laptop camera, desktop camera, automobile camera, etc.), a computing device with image capturing capabilities, etc. Moreover, the 2D content can be images, photos, videos (e.g., a still frame of a video, etc.), audio, pictures, media data, photographs, metadata, trade cards, any media representing a portion of a physical real world, a picture of an object, a content representing an item, a content depicting an entity, a corporeal object within the real world, etc.

At reference numeral 704, a 3-dimensional object can be created by aligning two or more portions of 2D content based on corresponding perspectives. The 2D content can be combined in accordance with the perspective or point-of-view of the content to assemble a 3D object that can be navigated and viewed (e.g., the 3D object as a whole includes a plurality of 2D images or content). At reference numeral 706, the creation of the 3D object is provided within the device. In other words, the device can capture 2D content and automatically create a 3D object from such 2D content. For example, 2D pictures of a pyramid (e.g., a first picture of a first side, a second picture of a second side, a third picture of a third side, a fourth picture of a fourth side, and a fifth picture of a bottom side) can be aggregated to assemble a 3D object that can be navigated or browsed in a 3D virtual environment based upon aligning the pictures with the corresponding point of view and overlapped content. It is to be appreciated that the aggregated or collected 2D content can be any suitable number of images or content.

FIG. 8 illustrates a method 800 for facilitates re-creating a 3D object or enhancing collection of 2D content related to a 3D object. At reference numeral 802, a request related to capturing a portion of 2-dimensional (2D) content can be received. At reference numeral 804, the request can be evaluated to determine whether 2D capture with a device is related to at least one of a re-creation of an existing 3D object or a supplementation of an existing 3D object. At reference numeral 806, guidance to a location and a perspective is provided to collect 2D content based in part upon the determined 2D capture.

For example, the assistance or guidance can be related to locations and/or orientations for the device in order to capture 2D content. Upon capturing the content with identified perspectives, orientations, and the like, the 3D image or object can be created. It is to be appreciated that the assistance or guidance can be a portion of audio, a portion of video, a route, a portion of text, a portion of a graphic, a map, and/or any other suitable data that can facilitate identifying a location, a perspective, an angle, and/or an orientation for the device to capture content in accordance with the 2D capture (e.g., re-creation or supplementation). For instance, the device can utilize a display to illustrate a map with routes and instructions on where to capture 2D content and from which perspective, orientation, angle, etc.

Figure 9:
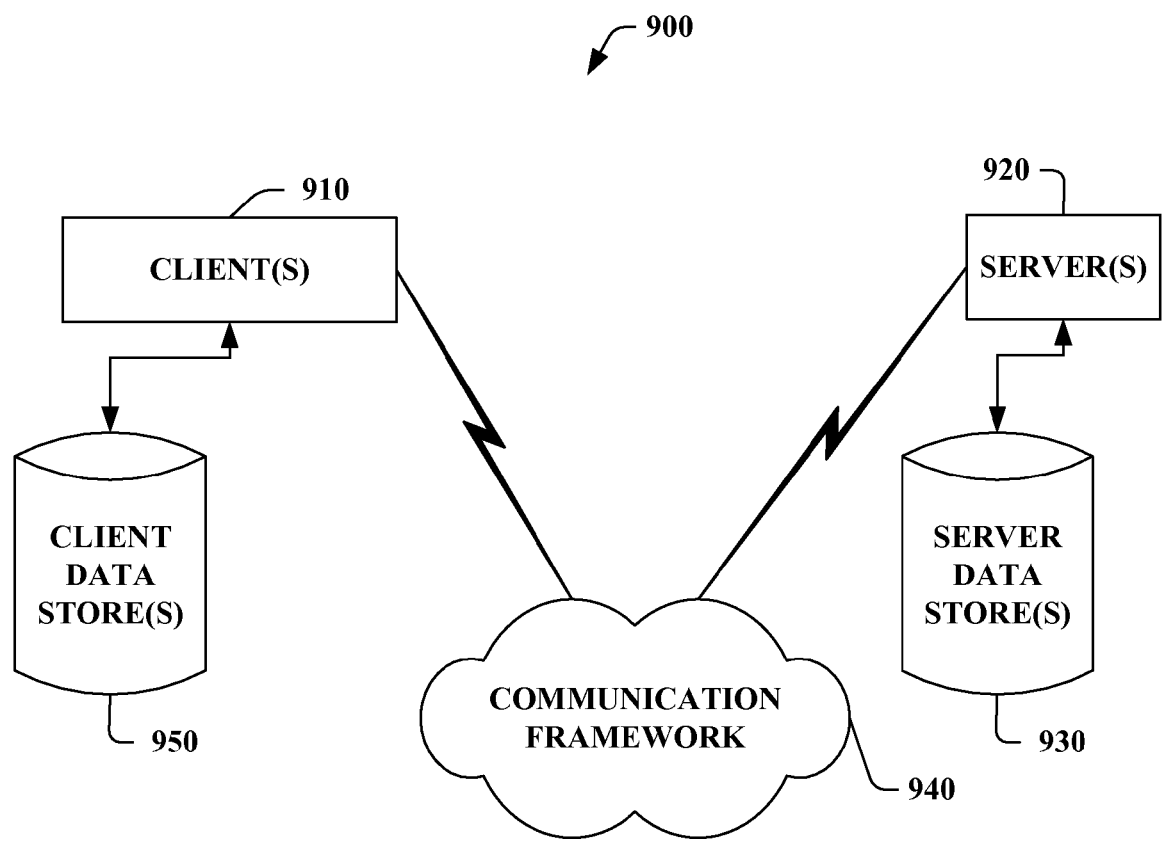
FIG. 9 illustrates an exemplary networking environment, wherein the novel aspects of the claimed subject matter can be employed.
Figure 10:
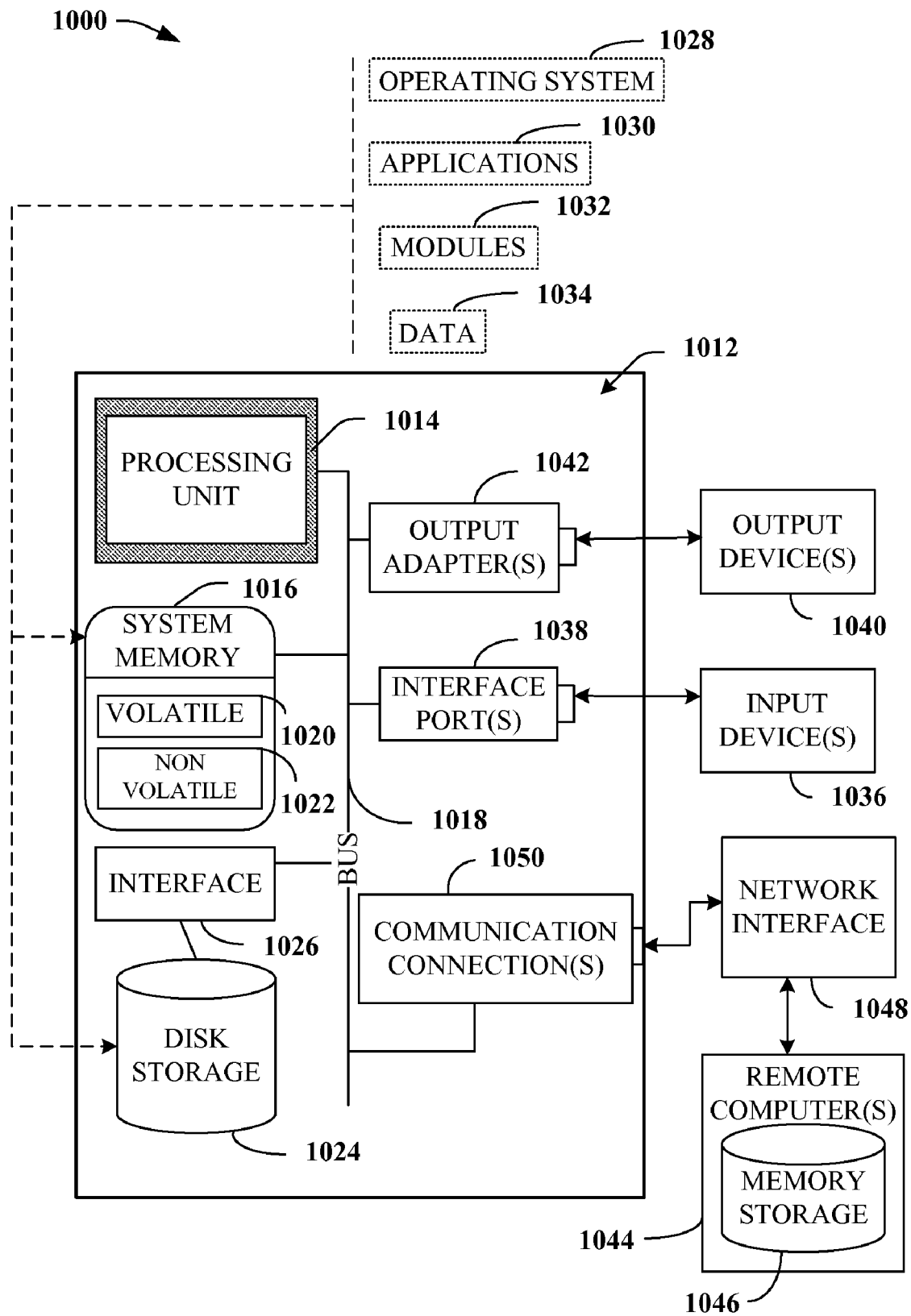
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, the device comprising a content aggregator that constructs a 3D image or object from a collection of 2D images, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates capturing a portion of 2-dimensional (2D) data for construction of a 3-dimentional (3D) object, comprising:
a device that captures a 2D image, the 2D image is representative of a corporeal object from a perspective dictated by an orientation of the device;
the device comprising a content aggregator that constructs a 3D object from two or more 2D images collected by the device, the construction is based at least in part upon aligning each corresponding perspective associated with each 2D image, each corresponding perspective is dependent upon the orientation of the device;
the device comprising a navigation component that provides a portion of guidance that instructs capturing a 2D image in accordance with a pre-defined structure in order to capture 2D content for the 3D object, the portion of guidance identifies at least one of a geographic location, a perspective, an angle for the device, an orientation for the device, or a zoom level for the device; and
the device leverages a global positioning system (GPS) component that provides geographic data to facilitate providing the portion of guidance.

2. The system of claim 1, the content aggregator renders the 3D object by aligning two or more 2D images that include at least one of a portion of substantially similar imagery or a portion of substantially similar perspective.

3. The system of claim 1, the 2D image is at least one of a photograph, a digital photograph, an image of the corporeal object, a frame from a segment of video capturing the corporeal object, or a frame of a portion of video.

4. The system of claim 1, the device is at least one of a digital camera, a video camera, a camera, a smartphone, a handheld, a web camera, a mobile device, a portable digital assistant (PDA), a cellular device, a disposable camera, an integrated camera within a device, or a computing device with an image capturing capability.

5. The system of claim 1, the device further comprising an evaluator that analyzes a 2D capture request, the 2D capture request defines a context for capturing the 2D image and relates to at least one of a creation of a new 3D object, a re-creation of a 3D object, or a supplementation of an existing 3D object.

6. The system of claim 5, the evaluator leverages a 3D environment that remotely hosts at least one 3D object to ascertain if the 3D object is at least one of an existing 3D object within the 3D environment, a previously accessed 3D object, or a new 3D object.

7. The system of claim 6, the device captures at least one 2D image for the supplementation of an existing 3D object, the captured 2D image supplements an existing 3D object and is communicated to the 3D environment.

8. The system of claim 7, the evaluator identifies a pre-defined structure for an existing 3D object or a previously accessed 3D object, the pre-defined structure is a blueprint defining 2D content and placement of such 2D content in order to construct a corresponding 3D object.

9. The system of claim 8, the content aggregator creates a pre-defined structure for a new 3D object in real time based at least in part upon evaluating content displayed within the 2D image.

10. The system of claim 9, the portion of guidance is at least one of a portion of audio, a portion of video, a route, a route on a geographic map, a set of geographic directions, a portion of text, or a portion of a graphic.

11. The system of claim 10, the portion of guidance is communicated via the device, the device further includes at least one of a speaker or a display.

12. The system of claim 9, the device further comprising an accelerometer that provides orientation data to facilitate providing the portion of guidance.

13. The system of claim 1, the device further comprising a real time tagging component that appends a captured 2D image associated with construction of a 3D object with a portion of metadata.

14. The system of claim 13, the portion of metadata is at least one of a portion of geographic data, a portion of author data, a portion of owner data, a portion of security data, a time, a date, an angle, a perspective, a portion of device data, a zoom level, a zoom, a point-of-view, a portion of 3D object association data, a position within a 3D object, an alignment within a 3D object, a category definition, a topic definition, a ranking, a popularity ranking, a quality ranking, a frame rate, a resolution, an object representation, a portion of pure view data, or a portion of authentic view data.

15. A computer-implemented method that facilitates incorporating 3-dimensional (3D) object construction within a device that captures 2-dimensional (2D) content, comprising:
capturing a portion of 2D content with a device;
providing a portion of guidance that instructs capturing the portion of 2D content in accordance with a pre-defined structure in order to capture 2D content for the 3D object, the portion of guidance identifies at least one of a geographic location, a perspective, an angle for the device, an orientation for the device, or a zoom level for the device;
using a global positioning system (GPS) component that provides geographic data to facilitate providing the portion of guidance;
creating the 3D object by aligning two or more portions of 2D content based at least in part upon the two or more portions of 2D content having corresponding perspectives, each corresponding perspective is dependent upon an orientation of the device, the creation of the 3D object is provided within the device; and
appending the captured portion of 2D content with a portion of metadata within the device.

16. The method of claim 15, further comprising:
receiving a request related to capturing a portion of the 2D content with the device;

evaluating the request to determine a 2D capture mode, the 2D capture mode is at least one of a re-creation of an existing 3D object or a supplementation of an existing 3D object; and providing guidance to a location and a perspective to collect a portion of 2D content based in part upon the determined 2D capture mode.

17. The method of claim 15, further comprising optimizing a device setting based upon the capture of 2D content for construction of a 3D object.

18. A device, comprising:

means for capturing a 2-dimensional (2D) image, the 2D image is representative of a corporeal object from a perspective dictated by an orientation of a device;

means for constructing a 3-dimensional (3D) object from two or more 2D images collected by the device, the construction is based at least in part upon aligning each corresponding perspective associated with each 2D image;

means for generating a portion of guidance to a geographic location in order to capture the 2D image representative of a portion of the 3D object;

means for communicating the portion of guidance via at least one of a display on the device or a speaker on the device;

means for leveraging a global positioning service (GPS) component to identify a location to facilitate generating the portion of guidance;

means for utilizing an accelerometer to identify an orientation for the device to facilitate generating the portion of guidance;

means for automatically appending the captured 2D image with a portion of metadata, the metadata relates to at least one of a geographic location, a content, or a relationship to the 3D object; and means for optimizing a device setting on the device based upon a characteristic of the 2D image or the constructed 3D object.

* * * * *